United States Patent
Lu et al.

(10) Patent No.: US 9,473,213 B2
(45) Date of Patent: Oct. 18, 2016

(54) WIRELESS CHARGING METHOD AND SYSTEM, AND MOBILE TERMINAL

(71) Applicant: Sony Corporation, Tokyo (JP)

(72) Inventors: Xiaoguang Lu, Beijing (CN); Wei Zhang, Beijing (CN); Tao Zhou, Beijing (CN); Hongxing Yu, Beijing (CN); Hairong Huang, Beijing (CN); Gang Xu, Beijing (CN); Zhannian Gao, Beijing (CN); Huawei Jia, Beijing (CN); Chen Zhao, Beijing (CN); Wentao Dai, Beijing (CN)

(73) Assignee: Sony Mobile Communications Inc., Tokyo (JP)

( * ) Notice: Subject to any disclaimer, the term of this patent is extended or adjusted under 35 U.S.C. 154(b) by 0 days.

(21) Appl. No.: 14/429,018

(22) PCT Filed: Sep. 10, 2014

(86) PCT No.: PCT/IB2014/064366
§ 371 (c)(1),
(2) Date: Mar. 18, 2015

(87) PCT Pub. No.: WO2015/166313
PCT Pub. Date: Nov. 5, 2015

(65) Prior Publication Data
US 2015/0311955 A1 Oct. 29, 2015

(51) Int. Cl.
*H04M 3/00* (2006.01)
*H04B 5/00* (2006.01)
*H04W 52/02* (2009.01)
*H04W 4/00* (2009.01)

(52) U.S. Cl.
CPC ........... *H04B 5/0037* (2013.01); *H04W 4/008* (2013.01); *H04W 52/0296* (2013.01)

(58) Field of Classification Search
CPC . H04B 5/0037; H04B 5/0093; H04W 4/008; H04W 52/0296; H04M 1/72569
USPC .................................................. 455/429, 419
See application file for complete search history.

(56) References Cited

U.S. PATENT DOCUMENTS

| | | |
|---|---|---|
| 2007/0103110 A1 | 5/2007 | Sagoo |
| 2009/0140692 A1* | 6/2009 | Hwang ................. G08C 17/04 320/108 |

(Continued)

FOREIGN PATENT DOCUMENTS

EP    2546956    1/2013

OTHER PUBLICATIONS

International Search Report and Written Opinion of the International Searching Authority relating to corresponding International Application No. PCT/IB2014/064366 mailed Feb. 12, 2015.

*Primary Examiner* — Juan A Torres
(74) *Attorney, Agent, or Firm* — Renner, Otto, Boisselle & Sklar, LLP.

(57) ABSTRACT

The embodiments of the present application provide a wireless charging method and system, and a mobile terminal. The wireless charging method includes: activating a wireless charging function by a first mobile terminal and a second mobile terminal; determining that the first mobile terminal is a wireless charging sender, and the second mobile terminal is a wireless charging receiver; and performing a wireless charging on the second mobile terminal by the first mobile terminal. The embodiments of the present application solve the problem that the power is insufficient in emergency situations. In addition, the operation is simple and the usage limitations are reduced.

17 Claims, 8 Drawing Sheets

(56) References Cited

U.S. PATENT DOCUMENTS

| | | | |
|---|---|---|---|
| 2012/0266001 A1 | 10/2012 | Sha et al. | |
| 2012/0309306 A1* | 12/2012 | Kim | H04B 5/0031 455/41.1 |
| 2013/0002191 A1* | 1/2013 | Jung | H02J 7/025 320/103 |
| 2014/0113550 A1 | 4/2014 | Li | |
| 2015/0205562 A1* | 7/2015 | Lin | G06F 3/1423 345/1.1 |

* cited by examiner

WIRELESS CHARGING METHOD AND SYSTEM, AND MOBILE TERMINAL

TECHNICAL FIELD

The present application relates to mobile communication technologies, and particularly, to a wireless charging method and system, and a mobile terminal.

CROSS REFERENCE TO RELATED APPLICATIONS

Reference is made to Chinese patent application No. 201410174640.4, filed 28 Apr. 2014, the entire disclosure of which hereby is incorporated by reference.

BACKGROUND ART

The wireless charging technology is derived from the wireless power transmission technology. The wireless charging is also referred to as induction charging, non-contact induction charging, etc., which utilizes the near-field induction (i.e., the inductive coupling), and transfers energy to a power consumption device from a power supply apparatus (charger). The power consumption device charges the battery with the received energy, and no wire connection is required between them. Thus both the charger and the power consumption device can enable their conductive contacts to be unexposed.

To be noted, the above introduction to the technical background is just made for the convenience of clearly and completely describing the technical solutions of the present application, and to facilitate the understanding by a person skilled in the art. It shall not be deemed that the above technical solutions are known to a person skilled in the art just because they have been illustrated in the Background section of the present application.

SUMMARY

However, the inventor finds that at present, in the wireless charging of a mobile terminal, the power supply apparatus is always an active power supply. In addition, a solution that performs a wired charging with USB is also limited, for example by the USB wire or interface. Under some scenarios, for example when an emergency call is to be received while the power of the mobile terminal is insufficient, the matter cannot be efficiently dealt with.

The embodiments of the present application provide a wireless charging method and system, and a mobile terminal. A wireless charging can be realized between the mobile terminals, thus a mobile terminal having a sufficient power can be conveniently employed to perform a wireless charging on a mobile terminal having an insufficient power, thereby solving the problem that the power is insufficient in emergency situations. In addition, the operation is simple and the usage limitations are reduced.

According to a first aspect of the embodiments of the present application, a wireless charging method is provided, including:

activating a wireless charging function by a first mobile terminal and a second mobile terminal;

determining that the first mobile terminal is a wireless charging sender, and the second mobile terminal is a wireless charging receiver; and performing a wireless charging on the second mobile terminal by the first mobile terminal.

According to a second aspect of the embodiments of the present application, wherein the first mobile terminal and the second mobile terminal activate the wireless charging function by establishing an association through a short range communication.

According to a third aspect of the embodiments of the present application, wherein the first mobile terminal initiating the short range communication is determined as the wireless charging sender, and the second mobile terminal receiving the short range communication is determined as the wireless charging receiver;

or, the first mobile terminal receiving the short range communication is determined as the wireless charging sender, and the second mobile terminal initiating the short range communication is determined as the wireless charging receiver.

According to a fourth aspect of the embodiments of the present application, wherein the first mobile terminal and/or the second mobile terminal activate the wireless charging function by receiving an instruction inputted by a user.

According to a fifth aspect of the embodiments of the present application, wherein the first mobile terminal receiving a send instruction is determined as the wireless charging sender, and the second mobile terminal receiving a receive instruction is determined as the wireless charging receiver;

or, the first mobile terminal receiving the send instruction is determined as the wireless charging sender, and the second mobile terminal not receiving any instruction is determined as the wireless charging receiver.

According to a sixth aspect of the embodiments of the present application, wherein the first mobile terminal and the second mobile terminal activate the wireless charging function according to detection information of a sensor.

According to a seventh aspect of the embodiments of the present application, wherein before the first mobile terminal and the second mobile terminal activate the wireless charging function, the method further includes:

comparing power of the first mobile terminal and the second mobile terminal;

activating the wireless charging function by the first mobile terminal and the second mobile terminal when a difference between the power of the first mobile terminal and the second mobile terminal is larger than a predetermined threshold.

According to an eighth aspect of the embodiments of the present application, wherein the method further includes:

by the second mobile terminal, directly using energy from the first mobile terminal, or storing the energy from the first mobile terminal into a battery.

According to a ninth aspect of the embodiments of the present application, wherein before the first mobile terminal performs the wireless charging on the second mobile terminal, the method further includes:

determining, by the first mobile terminal, a charging mode for performing a wireless charging on the second mobile terminal; and performing a wireless charging on the second mobile terminal according to the charging mode.

According to a tenth aspect of the embodiments of the present application, wherein before the first mobile terminal and the second mobile terminal activate the wireless charging function, the method further includes:

selecting, by the first mobile terminal, from a plurality of mobile terminals based on priorities, and determining the second mobile terminal as an object to be charged; and/or selecting, by the second mobile terminal, from a plurality of mobile terminals based on priorities, and determining the first mobile terminal as a charging party.

According to an eleventh aspect of the embodiments of the present application, a mobile terminal is provided, including:

a battery configured to store electric energy;

a master controller configured to control the mobile terminal; and a wireless charging transmitting circuit configured to wirelessly charge the electric energy stored in the battery into another mobile terminal, according to a control instruction from the master controller.

According to a twelfth aspect of the embodiments of the present application, wherein the mobile terminal further includes:

an amplification circuit configured to amplify the electric energy outputted by the battery, and output the amplified electric energy into the wireless charging transmitting circuit; and an electromagnetic induction coil configured to convert the electric energy outputted by the wireless charging transmitting circuit into electromagnetic induction energy.

According to a thirteenth aspect of the embodiments of the present application, wherein the mobile terminal further includes:

a short range communication unit configured to activate a wireless charging function by establishing an association with the other mobile terminal.

According to a fourteenth aspect of the embodiments of the present application, wherein the mobile terminal further includes:

an instruction receiving unit configured to activate a wireless charging function by receiving an instruction inputted by a user.

According to a fifteenth aspect of the embodiments of the present application, wherein the mobile terminal further includes:

a wireless charging receiving circuit configured to receive energy wirelessly sent by another terminal; and a charging controller configured to perform a control to directly use the energy from the wireless charging receiving circuit, or perform a control to store the energy from the wireless charging receiving circuit into a battery.

According to a sixteenth aspect of the embodiments of the present application, wherein the mobile terminal further includes:

a power comparison unit configured to compare power of the mobile terminal and the other mobile terminal; and when a difference between the power of the mobile terminal and the other mobile terminal is larger than a predetermined threshold, the master controller sends a control instruction for activating a wireless charging function.

According to a seventeenth aspect of the embodiments of the present application, wherein the mobile terminal further includes:

a mode determination unit configured to determine a charging mode for performing a wireless charging on the other mobile terminal; and the master controller controls the wireless charging transmitting circuit to perform a wireless charging on the other mobile terminal according to the charging mode.

According to an eighteenth aspect of the embodiments of the present application, wherein the mobile terminal further includes:

an object selection unit configured to select from a plurality of mobile terminals based on the priorities, and determine one or more mobile terminals as an object to be charged; and/or select from a plurality of mobile terminals based on the priorities, and determine one or more mobile terminals as a charging party.

According to a nineteenth aspect of the embodiments of the present application, wherein the mobile terminal further includes:

a sensor configured to detect information related to the mobile terminal to activate a wireless charging function.

According to a twentieth aspect of the embodiments of the present application, a wireless charging system is provided, including:

a first mobile terminal configured to serve as a wireless charging sender; and at least one second mobile terminal configured to serve as a wireless charging receiver.

The embodiments of the present application have the following beneficial effect: by realizing a wireless charging between the mobile terminals, a mobile terminal having a sufficient power can be conveniently employed to perform a wireless charging on a mobile terminal having an insufficient power, thereby solving the problem that the power is insufficient in emergency situations. In addition, the operation is simple and the usage limitations are reduced.

These and other aspects of the present application will be clear with reference to the subsequent descriptions and drawings, which specifically disclose the particular embodiments of the present application to indicate some implementations of the principle of the present application. But it shall be appreciated that the scope of the present application is not limited thereto, and the present application includes all the changes, modifications and equivalents falling within the scope, spirit and the connotations of the accompanying claims.

Features described and/or illustrated with respect to one embodiment can be used in one or more other embodiments in a same or similar way, and/or by being combined with or replacing the features in other embodiments.

To be noted, the term "comprise/include" used herein specifies the presence of feature, element, step or component, not excluding the presence or addition of one or more other features, elements, steps or components or combinations thereof.

Many aspects of the present application will be understood better with reference to the following drawings. The components in the drawings are not necessarily drafted in proportion, and the emphasis lies in clearly illustrating principles of the present application. For the convenience of illustrating and describing some portions of the present application, corresponding portions in the drawings may be enlarged, e.g., being more enlarged relative to other portions than the situation in the exemplary device practically manufactured according to the present application. The parts and features illustrated in one drawing or embodiment of the present application may be combined with the parts and features illustrated in one or more other drawings or embodiments. In addition, the same reference signs denote corresponding portions throughout the drawings, and they can be used to denote the same or similar portions in more than one embodiment.

BRIEF DESCRIPTION OF DRAWINGS

The accompanying drawings are included to provide further understanding of the present application, and they constitute a part of the Specification. Those drawings illustrate the preferred embodiments of the present application, and explain principles of the present application with the descriptions, wherein the same element is always denoted with the same reference sign.

In the annexed drawings.

DESCRIPTION OF EMBODIMENTS

The interchangeable terms "electronic device" and "electronic apparatus" include a portable radio communication device. The term "portable radio communication device", which is hereinafter referred to as "mobile radio terminal", "portable electronic apparatus", or "portable communication apparatus", includes all devices such as mobile phone, pager, communication apparatus, electronic organizer, personal digital assistant (PDA), smart phone, portable communication apparatus, etc.

In the present application, the embodiments of the present application are mainly described with respect to a portable electronic apparatus in the form of a mobile phone (also referred to as "cellular phone"). However, it shall be appreciated that the present application is not limited to the case of the mobile phone and it may relate to any type of appropriate electronic device, such as media player, gaming device, PDA, computer, digital camera, tablet computer, wearable electronic device, etc.

Embodiment 1

Figure 1:
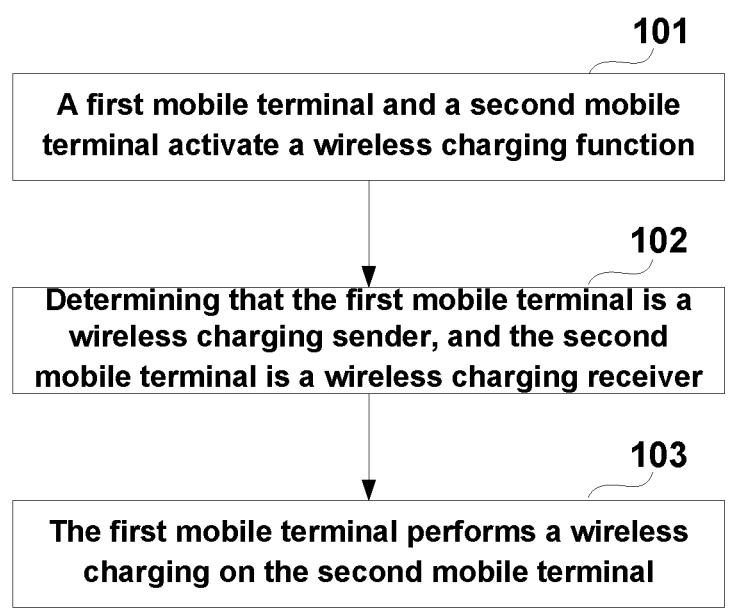
FIG. 1 is a flow diagram of a wireless charging method according to Embodiment 1 of the present application.

This embodiment of the present application provides a wireless charging method. FIG. 1 is a flow diagram of a wireless charging method according to Embodiment 1 of the present application. As illustrated in FIG. 1, the wireless charging method includes:

Step 101: a first mobile terminal and a second mobile terminal activate a wireless charging function.

Step 102: determining that the first mobile terminal is a wireless charging sender, and the second mobile terminal is a wireless charging receiver.

Step 103: the first mobile terminal performs a wireless charging on the second mobile terminal.

In this embodiment, the first mobile terminal and the second mobile terminal may be mobile communication terminal (e.g., cellular phone); tablet PC, digital camera, notebook computer, etc.; or wearable devices such as Google glass, iwatch, etc. The present application is not limited thereto, and hereinafter descriptions are given through an example where both the first mobile terminal and the second mobile terminal are mobile communication terminals.

In this embodiment, it is determined that the first mobile terminal is a wireless charging sender, and the second mobile terminal is a wireless charging receiver. For example, the first mobile terminal has the hardware structure for sending the wireless charging, such as an electromagnetic induction coil, through which electric energy stored in the battery is converted into electromagnetic induction energy; and the second mobile terminal has a hardware structure for receiving the wireless charging, such as receiving the electromagnetic induction energy through the electromagnetic induction coil, and storing the received energy in the battery.

Please refer to Embodiment 2 for the hardware structures of the wireless charging sender and the wireless charging receiver. The hardware structure for the wireless charging is not limited herein, and any of the existed modes may be used, such as electromagnetic induction charging, magnetic resonance charging or radio wave charging.

Next, the wireless charging between two mobile terminals will be further described.

In one implementation, an association may be established between the first mobile terminal and the second mobile terminal by using a short range communication technology to activate the wireless charging function. For example, the short range communication technology for example is Near Field Communication (NFC), Bluetooth, infrared remote control, or WIFI. The present application is not limited thereto, and any technology communicating within a short range may be used.

Taking the NFC as an example, wherein the first mobile terminal initiating the NFC may be determined as the wireless charging sender, and the second mobile terminal accepting the NFC may be determined as the wireless charging receiver; or, the first mobile terminal accepting the NFC may be determined as the wireless charging sender, and the second mobile terminal initiating the NFC may be determined as the wireless charging receiver.

Figure 2:
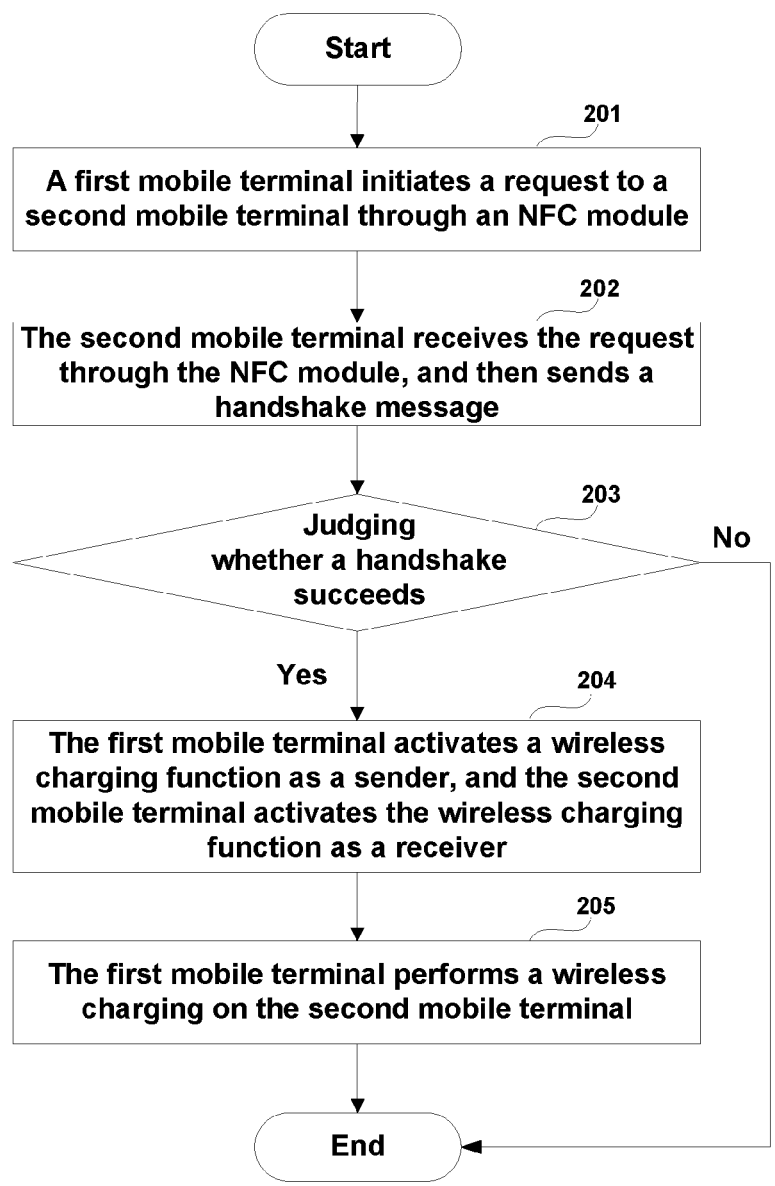
FIG. 2 is another flow diagram of a wireless charging method according to Embodiment 1 of the present application.

FIG. 2 is another flow diagram of a wireless charging method according to Embodiment 1 of the present application, which illustrates the situation where a first mobile terminal initiates an NFC and then performs a wireless charging on a second mobile terminal. As illustrated in FIG. 2, the wireless charging method includes:

Step 201: a first mobile terminal initiates a request to a second mobile terminal through an NFC module.

In this embodiment, both the first mobile terminal and the second mobile terminal may have an NFC module, please refer to related technologies for related contents of the NFC.

Step 202: the second mobile terminal receives the request through the NFC module, and then sends a handshake message.

Step 203: judging whether a handshake succeeds, and if so, performing step 204.

Step 204: the first mobile terminal activates the wireless charging function as a sender, and the second mobile terminal activates the wireless charging function as a receiver.

In this embodiment, the first mobile terminal is determined as a wireless charger; and the second mobile terminal is determined as a party to be charged, which may detect the wireless charger and make related preparations.

Step 205: the first mobile terminal performs a wireless charging on the second mobile terminal.

To be noted, the above content just schematically describes how to associate the first mobile terminal and the second mobile terminal with each other through the NFC module, and how to determine the sender and the receiver. But the present application is not limited thereto, and other communication mode such as Bluetooth may be used for the association.

Figure 3:
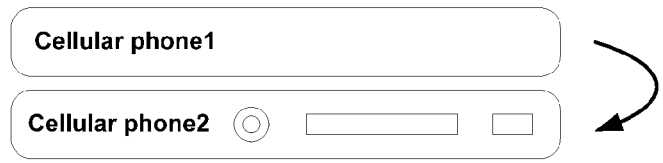
FIG. 3 is a diagram of a wireless charging between mobile terminals according to Embodiment 1 of the present application.

FIG. 3 is a diagram of a wireless charging between mobile terminals according to Embodiment 1 of the present application. As illustrated in FIG. 3, a first mobile terminal (cellular phone 1) may adjoin a second mobile terminal (cellular phone 2), for example, the position of an electromagnetic induction coil of the cellular phone 1 for the wireless charging directly faces the position of an electromagnetic induction coil of the cellular phone 2 for the wireless charging, thereby achieving a wireless charging of higher conversion efficiency.

In another implementation, the first mobile terminal and/or the second mobile terminal activates the wireless charging function by receiving an instruction inputted by the user. For example, the first mobile terminal receiving a send instruction is determined as the wireless charging sender, and the second mobile terminal receiving a receive instruction is determined as the wireless charging receiver; or, the first mobile terminal receiving the send instruction is determined as the wireless charging sender, and the second mobile terminal not receiving any instruction is determined as the wireless charging receiver.

Figure 4:
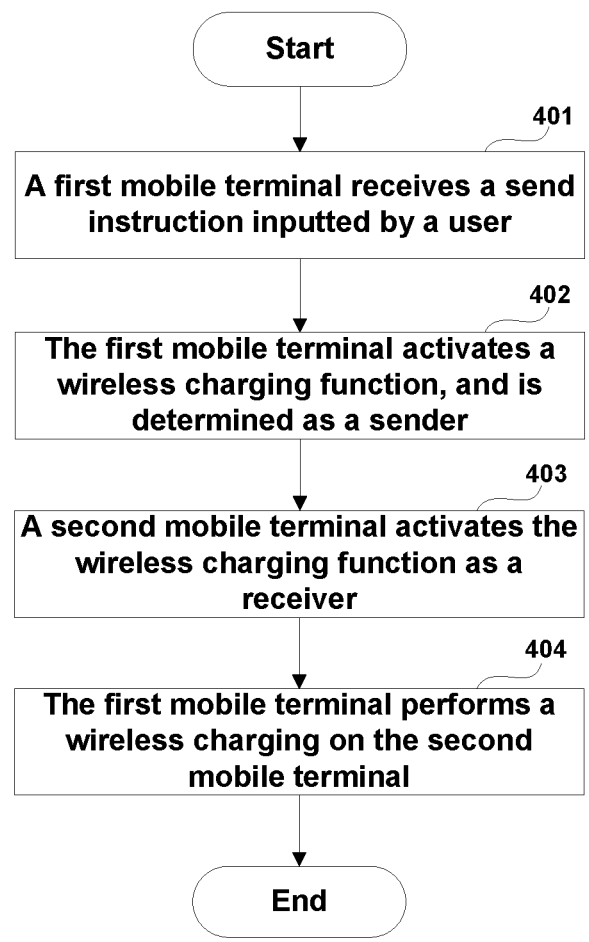
FIG. 4 is still another flow diagram of a wireless charging method according to Embodiment 1 of the present application.

FIG. 4 is still another flow diagram of a wireless charging method according to Embodiment 1 of the present application, which illustrates the situation where a first mobile terminal receives a send instruction inputted by a user, and then performs a wireless charging on a second mobile terminal. As illustrated in FIG. 4, the wireless charging method includes:

Step 401: a first mobile terminal receives a send instruction inputted by a user.

In this embodiment, the send instruction inputted by the user may be received by setting a man-machine interactive interface through software. For example, a button for the wireless charging (to realize the function similar to that of a switch) may be set in the menu of a cellular phone, and when the user presses the button, the first mobile terminal is determined as the wireless charging sender.

Step 402: the first mobile terminal activates a wireless charging function, and is determined as a sender.

Step 403: the second mobile terminal activates the wireless charging function as a receiver.

In this embodiment, a man-machine interactive interface may also be set in the second mobile terminal to receive the receive instruction inputted by the user. For example, a button for the wireless charging (to realize the function similar to that of a switch) may be set in the menu of a cellular phone, and when the user presses the button, the second mobile terminal is determined as the wireless charging receiver.

Or, the second mobile terminal may be defaulted as the wireless charging receiver when no instruction is received and the wireless charger is detected.

Step 404: the first mobile terminal performs a wireless charging on the second mobile terminal.

Through the software setting similar to a switch, the wireless charging from one mobile terminal to another mobile terminal can be realized. But the present application is not limited to the software setting, and it also may be implemented with hardware, for example by adding a key for the wireless charging.

Schematic descriptions of the activation of a wireless charging between two mobile terminals are given above by taking the NFC and the user inputted instruction as examples. But the present application is not limited thereto, for example the wireless charging function can also be activated according to the detection information of a sensor.

For example, the sensor may be any sensor disposed at the mobile terminal to detect information related to the mobile terminal, and it may be one or arbitrary combinations of an acceleration sensor, a proximity sensor, a temperature sensor, a speed transducer, a barometric pressure sensor, a geomagnetic sensor, a deformation sensor, a humidity sensor and a light sensor, but the present application is not limited thereto.

For example, both the first mobile terminal and the second mobile terminal may be provided with an acceleration sensor. When the first mobile terminal and the second mobile terminal are adjoined each other in a manner of being arranged at upper and lower positions, and shaken in the same frequency, the acceleration sensors of the first mobile terminal and the second mobile terminal can both detect the shaking, thus the wireless charging functions of the first mobile terminal and the second mobile terminal can be activated respectively according to the detected information. Meanwhile, the first mobile terminal located above may be determined as the wireless charging sender, and the second mobile terminal located below may be determined as the wireless charging receiver.

To be noted, the present application is just schematically described as above, and the present application is not limited thereto. Next, the present application will be further described.

Figure 5:
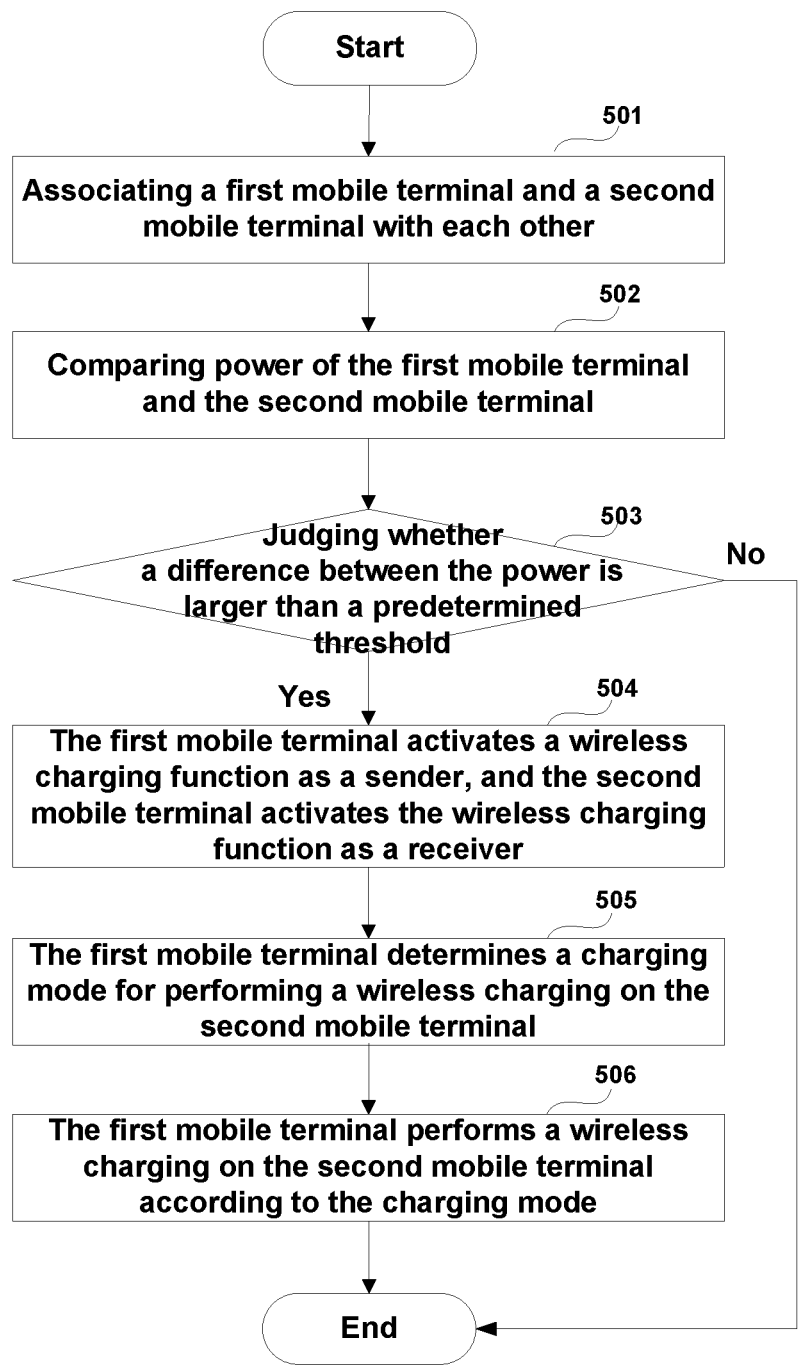
FIG. 5 is yet another flow diagram of a wireless charging method according to Embodiment 1 of the present application.

FIG. 5 is yet another flow diagram of a wireless charging method according to Embodiment 1 of the present application. As illustrated in FIG. 5, the wireless charging method includes:

Step 501: associating a first mobile terminal and a second mobile terminal with each other.

For example, an association may be made using an NFC module, but the present application is not limited thereto, and other communication mode may be used.

Step 502: comparing power of the first mobile terminal and the second mobile Terminal.

Step 503: judging whether a difference between the power of the first mobile terminal and the second mobile terminal is larger than a predetermined threshold; and if so, performing step 504.

For example, when an association is made using the NFC module, the first mobile terminal and the second mobile terminal may acquire the power information from each other. After acquiring the power information of the second mobile terminal, such as 5%, the first mobile terminal may compare the power information with power information of itself, such as 90%. It can be determined that the difference is 85%, which is larger than the predetermined threshold, such as 50%. Thus it can be determined that the wireless charging shall be performed.

Or, after acquiring the power information of the second mobile terminal, such as 20%, the first mobile terminal may compare the power information with power information of itself, such as 50%. It can be determined that the difference is 30%, which is smaller than the predetermined threshold, such as 50%. Thus it can be determined that the wireless charging shall not be performed.

Step 504: the first mobile terminal activates the wireless charging function as a sender, and the second mobile terminal activates the wireless charging function as a receiver.

In this embodiment, under some scenarios, a mobile terminal having a low power may charge a mobile terminal having a high power. For example, when the first mobile terminal requires more power to deal with a service, it may collect the power of one or more mobile terminals having low electric quantities to obtain sufficient power.

For example, when the power information of the first mobile terminal is for example 20% and the power information of the second mobile terminal is for example 75%, it can be determined that the wireless charging shall be performed. The first mobile terminal serves as the sender, and the second mobile terminal serves as the receiver.

Step 505: the first mobile terminal determines a charging mode for performing a wireless charging on the second mobile terminal.

In this embodiment, the charging mode may be various charging-related information; such as charging level, charging time, charging intensity, etc. For example, the charging level may be a predefined power, for example, level 1 indicates 5% charging, level 2 indicates 10% charging, level 3 indicates 15% charging, etc. The charging time may be the charging duration, such as 1 minute, 3 minutes, etc. The charging intensity may be a predefined intensity, such as high power charging, middle power charging, small power charging, etc.

Step 506: the first mobile terminal performs a wireless charging on the second mobile terminal according to the charging mode.

In the above embodiment, the descriptions are given through an example using two mobile terminals, but the present application is not limited thereto, and other situations may be included, e.g., one mobile terminal performs a wireless charging on another mobile terminals, or a plurality of mobile terminals perform a wireless charging on one mobile terminal, or a plurality of mobile terminals perform a wireless charging on a plurality of mobile terminals. Further descriptions will be given as follows.

In this embodiment, after the first mobile terminal and the second mobile terminal activate the wireless charging functions, the method may further include: the first mobile terminal selects from a plurality of mobile terminals based on priorities, and determines the second mobile terminal as an object to be charged, and/or the second mobile terminal selects from a plurality of mobile terminals based on priorities, and determines the first mobile terminal as a charging party.

As an example, the priorities may be pre-determined statically. For example, it may be predefined that the charging priority of the cellular phone is higher than that of the tablet PC; the priorities may also be determined dynamically, such as varied dynamically with time, location or information detected by the sensor.

For example, when mobile terminal A can perform a wireless charging on another mobile terminals, associations with another mobile terminals B (cellular phone), C (camera) and D (tablet PC) may be established through the NFC. Next, from the case that the current time is 10:00 AM (i.e., working time), it is determined that the priority of mobile terminal B is the highest (the probability of using the cellular phone in the working time is the largest), thus mobile terminal B is determined as the object to be charged.

For another example, when mobile terminal A requires a wireless charging, associations with other mobile terminals B (cellular phone), C (camera) and D (tablet PC) may be established through the NFC. Next, from the detection information of the current speed sensor (e.g., the current moving speed is 100 km/h), it is determined that the user is travelling by taking a high speed train, so the camera will not be used temporarily. Thus it is determined that the priority of mobile terminal C is the highest (the probability of using the camera is the lowest at that time), and mobile terminal C is determined as the charging party.

To be noted, the situations where there are a plurality of charging parties or a plurality of parties to be charged are schematically described as above, but the present application is not limited thereto, and specific scenarios may be determined according to the actual conditions.

For example, a plurality of mobile terminals may be managed in a manner of group management, wherein one or more charging parties and one or more parties to be charged are determined through the group management, thus the object to be charged does not need to acquire the information of the charging party, or the charging party does not need to acquire the information of the object to be charged.

How to determine the sender and receiver before the wireless charging is described as above. In this embodiment, during the wireless charging, the charging mode can be dynamically changed, or the sender and the receiver can be changed, according to the detection information of the sensor or the received user instruction.

For example, when the first mobile terminal charges the second mobile terminal, it is determined according to for example step 505 that the charging mode is level 1, e.g., the second mobile terminal is charged for a power of 5%. However, in the charging process, the acceleration sensors of the first mobile terminal and the second mobile terminal both detect a shaking of a particular frequency (e.g., it means that the receiver requires more power), the first mobile terminal may adjust the charging mode from level 1 to level 2 according to the detection information, i.e., to charge the second mobile terminal for a power of 10%.

As can be seen from the above embodiment, by realizing a wireless charging between the mobile terminals, a mobile terminal having a sufficient power can be conveniently employed to perform a wireless charging on a mobile terminal having an insufficient power, thereby solving the problem that the power is insufficient in emergency situations. In addition, the operation is simple and the usage limitations are reduced.

Embodiment 2

Figure 6:
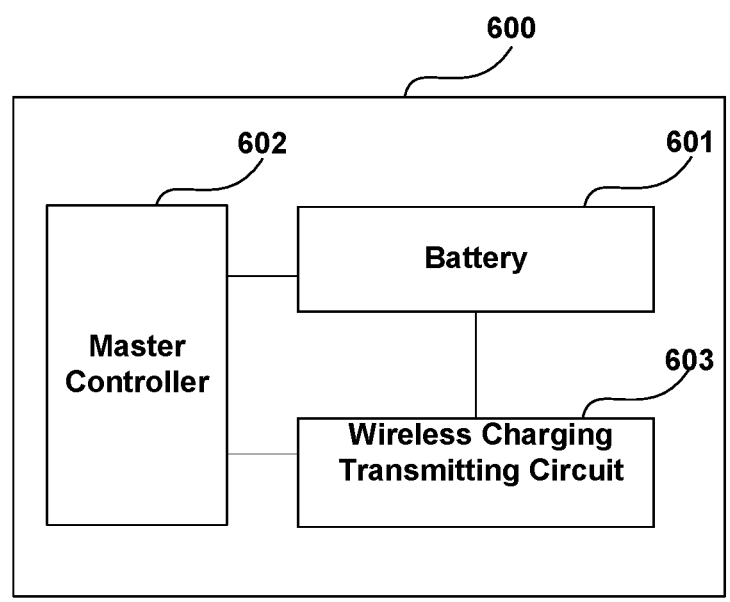
FIG. 6 is a construction diagram of a mobile terminal according to Embodiment 2 of the present application.

This embodiment of the present application provides a mobile terminal, which is corresponding to the wireless charging method in Embodiment 1, and the same contents are omitted herein. FIG. 6 is a construction diagram of a mobile terminal according to Embodiment 2 of the present application. For the purpose of convenience, other members of the mobile terminal are not illustrated in FIG. 6.

As illustrated in FIG. 6, the mobile terminal 600 includes a battery 601 configured to store electric energy; a master controller 602 configured to control the mobile terminal 600; and a wireless charging transmitting circuit 603 configured to wirelessly charge the electric energy stored in the battery 601 into another mobile terminal, according to a control instruction from the master controller 602. For example, the master controller 602 may include various hardware and/or software components, such as those described below with respect to the mobile terminal 900. For example, the master controller 602 may include the CPU 100 and software (computer) instructions stored in memory 140; and depending on operation, other components, such as sensors and so on as are described by way of examples herein. For example, the CPU 100 following instructions stored in memory 140 may carry out the functions described herein of the master controller 602.

In this embodiment, the wireless charging transmitting circuit 603 may use an electromagnetic induction charging. In addition, the wireless charging transmitting circuit 603 may further include other circuit for realizing the wireless charging. But the present application is not limited thereto, and any of the existing modes may be used, such as electromagnetic induction charging, magnetic resonance charging or radio wave charging.

Next, the structure of the mobile terminal in the embodiment will be schematically described by taking the electromagnetic induction charging and the NFC module as an example.

Figure 7:
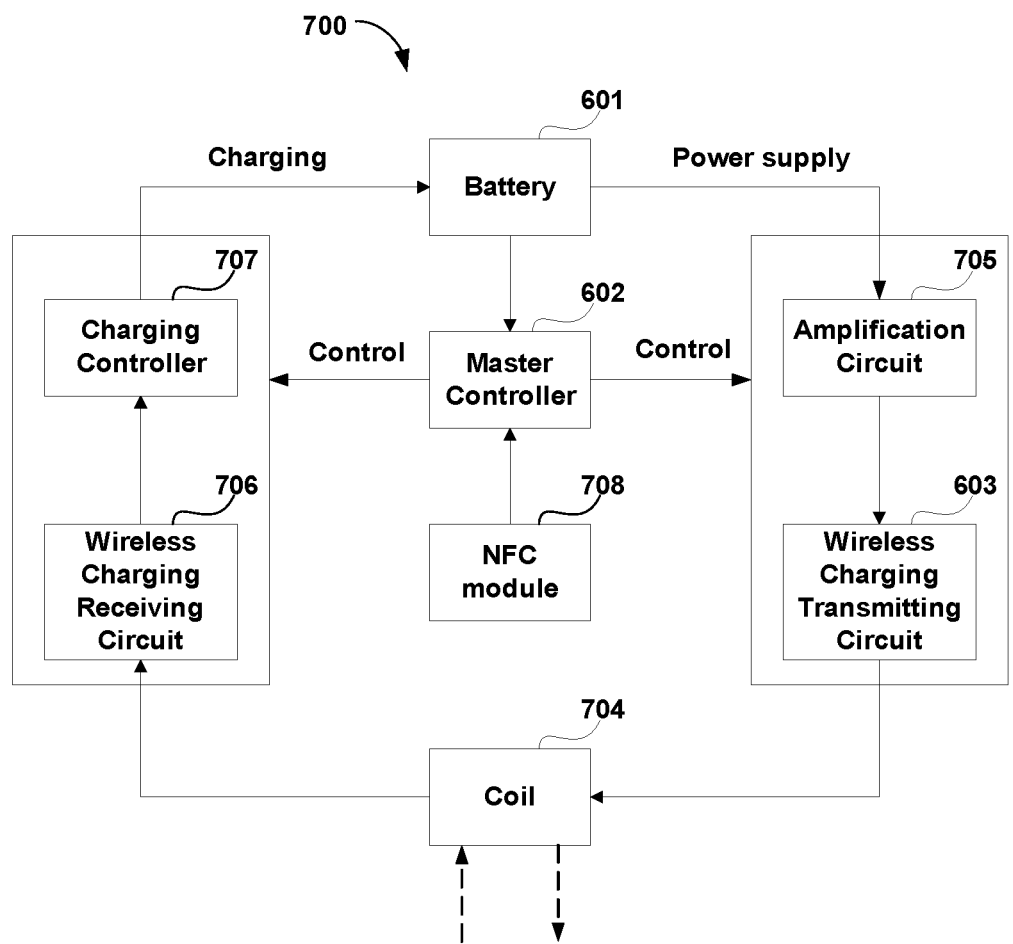
FIG. 7 is another construction diagram of a mobile terminal according to Embodiment 2 of the present application.

FIG. 7 is another construction diagram of a mobile terminal according to Embodiment 2 of the present application. As illustrated in FIG. 7, a mobile terminal 700 includes a battery 601, a master controller 602 and a wireless charging transmitting circuit 603, as described above.

As illustrated in FIG. 7, the mobile terminal 700 may further include: an amplification circuit 705 configured to amplify the electric energy outputted by the battery 601, and output the amplified electric energy into the wireless charging transmitting circuit 603; and an electromagnetic induction coil 704 configured to convert the electric energy outputted by the wireless charging transmitting circuit 603 into electromagnetic induction energy.

In this embodiment, both a first mobile terminal and a second mobile terminal may have receiving and transmitting hardware structures for the wireless charging simultaneously. After the sender and the receiver are determined, the sender activates related hardware circuit for transmitting the wireless charging to convert the energy of the battery into corresponding electromagnetic signal, while the receiver activates related hardware circuit for receiving the wireless charging and charges the battery using a charging control chip.

As illustrated in FIG. 7, the mobile terminal 700 may further include a wireless charging receiving circuit 706 configured to receive energy wirelessly transmitted from another terminal; a charging controller 707 configured to perform a control to directly use the energy from the wireless charging receiving circuit 706, or perform a control to store the energy from the wireless charging receiving circuit 706 into the battery 601. Through the wireless charging transmitting circuit 603, the wireless charging receiving circuit 706 and the charging controller 707, the mobile terminal 700 can not only perform a wireless charging on another mobile terminal, but also receive a wireless charging from another mobile terminal.

As illustrated in FIG. 7, the mobile terminal 700 may further include an NFC unit 708 configured to activate a wireless charging function by establishing an association with another mobile terminal. But the present application is not limited thereto, for example, an instruction receiving unit may be used to receive an instruction inputted by the user to activate the wireless charging function.

Figure 8:
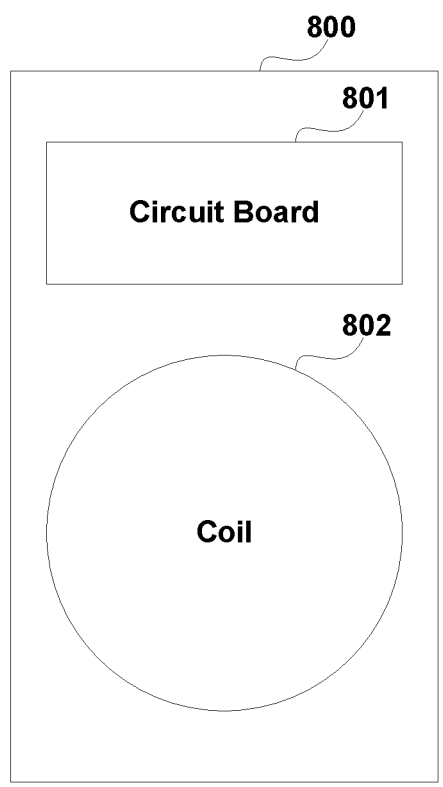
FIG. 8 is still another construction diagram of a mobile terminal according to Embodiment 2 of the present application.

FIG. 8 is still another construction diagram of a mobile terminal according to Embodiment 2 of the present application, which illustrates the construction of an integrated mobile terminal 800. As illustrated in FIG. 8, a master controller, a wireless charging transmitting circuit, a wireless charging receiving circuit, etc. may be integrated into a circuit board 801. In addition, a wireless charging may be performed on another mobile terminal by sending electromagnetic induction energy through a coil 802, and electromagnetic induction energy sent from another mobile terminal may be received through the coil 802.

In this embodiment, the mobile terminal may further include: a power comparison unit configured to compare power of the first mobile terminal and the second mobile terminal; and when a difference between the power of the first mobile terminal and the second mobile terminal is larger than a predetermined threshold, the master control circuit sends a control instruction for activating a wireless charging function.

In this embodiment, the mobile terminal may further include a mode determination unit configured to determine a charging mode for performing a wireless charging on the second mobile terminal; and the master control circuit controls the wireless charging transmitting circuit to perform a wireless charging on another mobile terminal according to the charging mode.

In this embodiment, the mobile terminal may further include: an object selection unit configured to select from a plurality of mobile terminals based on the priorities, and determine one or more of the mobile terminals as an object to be charged; and/or select from a plurality of mobile terminals based on the priorities, and determine one or more of the mobile terminals as a charging party.

In this embodiment, the mobile terminal may further include a sensor configured to detect information related to the mobile terminal to activate a wireless charging function. The sensor may be one or arbitrary combinations of an acceleration sensor, a proximity sensor, a temperature sensor, a speed transducer, a barometric pressure sensor, a geomagnetic sensor, a deformation sensor, a humidity sensor and a light sensor, but the present application is not limited thereto.

Next, the mobile terminal of the present application will be further described by taking a mobile communication terminal as an example.

Figure 9:
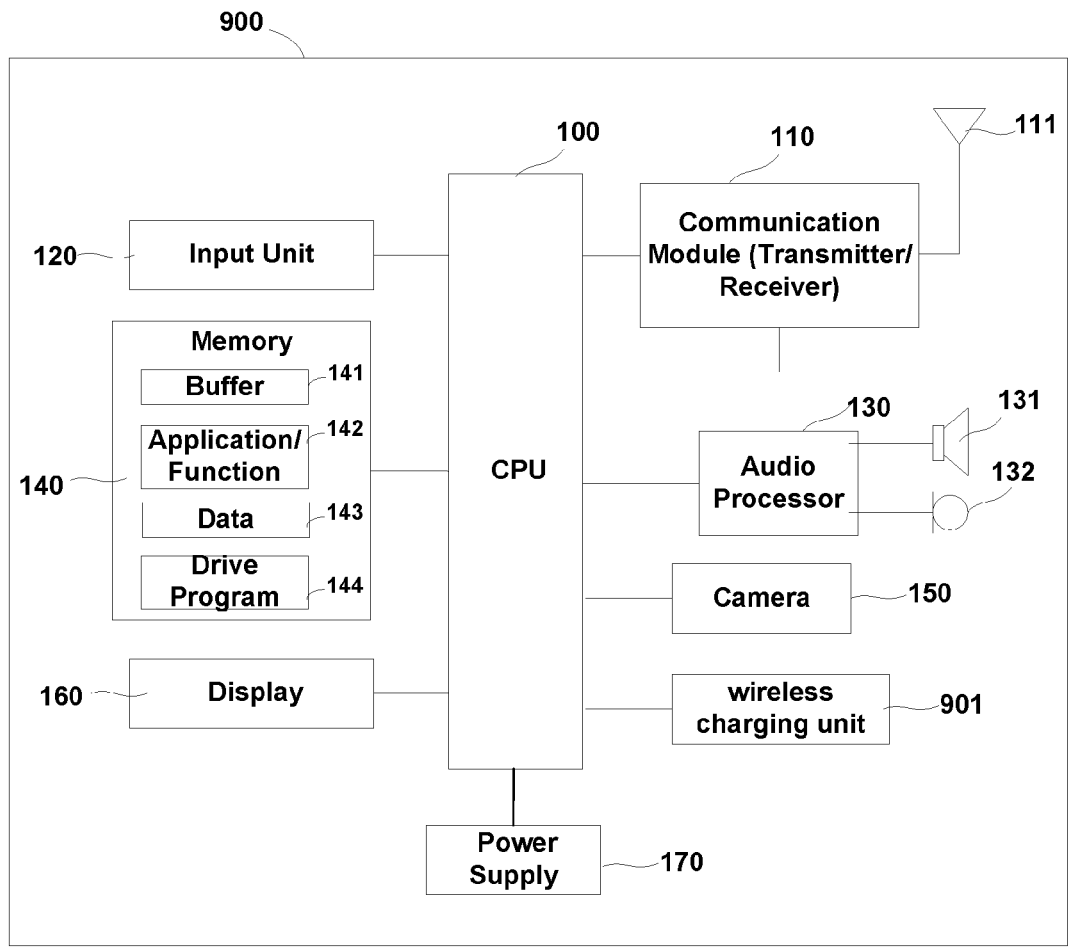
FIG. 9 is a block diagram of a system construction of a mobile terminal according to Embodiment 2 of the present application.

FIG. 9 is a block diagram of a system construction of a mobile terminal according to Embodiment 2 of the present application. The mobile terminal 900 may include a Central Processing Unit (CPU) 100 and a memory 140 coupled to the CPU 100. To be noted, the diagram is exemplary, and other type of structure may also be used to supplement or replace the structure, so as to realize the telecom function or other function.

As illustrated in FIG. 9, the mobile terminal 900 includes a battery 170 and a wireless charging unit 901. For example, the wireless charging unit 901 may include a wireless charging transmitting circuit, or a wireless charging transmitting circuit and a wireless charging receiving circuit. The mobile terminal 900 may further include a communication module 110, an input unit 120, an audio processor 130, a camera 150 and a display 160.

The CPU 100 (sometimes called as controller or operation control, including microprocessor or other processor device and/or logic device) receives an input and controls respective parts and operations of the mobile terminal 900. The input unit 120 provides an input to the CPU 100. The input unit 120 for example is a key or a touch input device. The camera 150 captures image data and supplies the captured image data to the CPU 100 for a storage, a transmission, etc.

The battery 170 supplies electric power to the mobile terminal 900. The display 160 displays objects such as images and texts. The display may be, but not limited to, an LCD.

The memory 140 may be a solid state memory, such as Read Only Memory (ROM), Random Access Memory (RAM), SIM card, etc., or a memory which stores information even if the power is off, which can be selectively erased and provided with more data, and the example of such a memory is sometimes called as EPROM, etc. The memory 140 also may be a certain device of other type. The memory 140 includes a buffer memory 141 (sometimes called as buffer). The memory 140 may include an application/function storage section 142 which stores application programs and function programs or performs the operation procedure of the mobile terminal 900 via the CPU 100.

The memory 140 may further include a data storage section 143 which stores data such as contacts, digital data, pictures, sounds, pre-stored information of the shooter, pre-stored information of the shot object and/or any other data used by the mobile terminal 900. A drive program storage section 144 of the memory 140 may include various drive programs of the mobile terminal 900 for performing the communication function and/or other functions (e.g., messaging application, address book application, etc.) of the mobile terminal 900.

The communication module 110 is a transmitter/receiver 110 which transmits and receives signals via an antenna 111. The communication module (transmitter/receiver) 110 is coupled to the CPU 100, so as to provide an input signal and receive an output signal, which may be the same as the situation of conventional mobile communication terminal.

Based on different communication technologies, the same electronic device may be provided with a plurality of communication modules 110, such as cellular network module, Bluetooth module and/or wireless local area network (WLAN) module. The communication module (transmitter/receiver) 110 is further coupled to a speaker 131 and a microphone 132 via an audio processor 130, so as to provide an audio output via the speaker 131, and receive an audio input from the microphone 132, thereby performing the normal telecom function. The audio processor 130 may include any suitable buffer, decoder, amplifier, etc. In addition, the audio processor 130 is further coupled to the CPU 100, so as to locally record sound through the microphone 132, and play the locally stored sound through the speaker 131.

As can be seen from the above embodiment, by realizing a wireless charging between the mobile terminals, a mobile terminal having a sufficient power can be conveniently employed to perform a wireless charging on a mobile terminal having an insufficient power, thereby solving the problem that the power is insufficient in emergency situations. In addition, the operation is simple and the usage limitations are reduced.

Embodiment 3

This embodiment of the present application provides a wireless charging system, and contents the same as those in Embodiments 1 and 2 are omitted herein.

Figure 10:
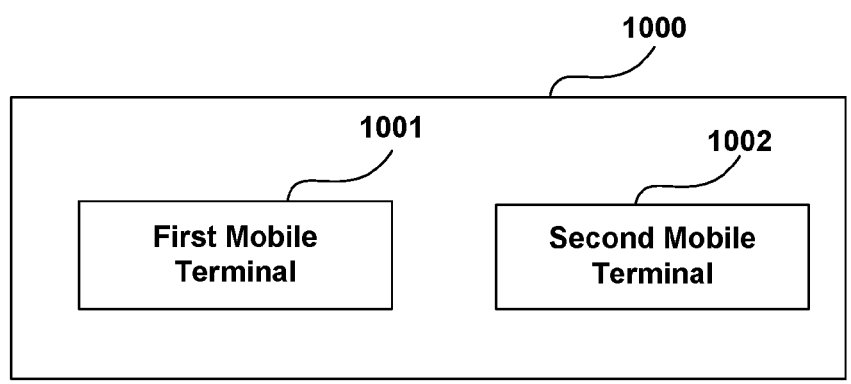
FIG. 10 is a construction diagram of a wireless charging system according to Embodiment 3 of the present application.

FIG. 10 is a construction diagram of a wireless charging system according to Embodiment 3 of the present application. As illustrated in FIG. 10, the wireless charging system 1000 includes:

a first mobile terminal 1001 configured to serve as a wireless charging sender; and at least one second mobile terminal 1002 configured to serve as a wireless charging receiver.

In this embodiment, the first mobile terminal 1001 may be any of mobile terminals 600 to 900 in Embodiment 2; the second mobile terminal 1002 may also be any of mobile terminals 600 to 900 in Embodiment 2, or an existing mobile terminal capable of receiving a wireless charging. For example, there may be one or more second mobile terminals 1002. For example, the first mobile terminal 1001 may simultaneously perform a wireless charging on more than two second mobile terminals 1002.

The preferred embodiments of the present application are described as above with reference to the drawings. Many features and advantages of those embodiments are apparent from the detailed Specification, thus the accompanied claims intend to cover all such features and advantages of those embodiments which fall within the spirit and scope thereof. In addition, since numerous modifications and changes are easily conceivable to a person skilled in the art, the embodiments of the present application are not limited to the exact structures and operations as illustrated and described, but cover all suitable modifications and equivalents falling within the scope thereof.

It shall be understood that each of the parts of the present application may be implemented by hardware, software, firmware, or combinations thereof. In the above embodiments, multiple steps or methods may be implemented by software or firmware stored in the memory and executed by an appropriate instruction executing system. For example, if the implementation uses hardware, it may be realized by any one of the following technologies known in the art or combinations thereof as in another embodiment: a discrete logic circuit having a logic gate circuit for realizing logic functions of data signals, application-specific integrated circuit having an appropriate combined logic gate circuit, a programmable gate array (PGA), and a field programmable gate array (FPGA), etc.

Any process, method or block in the flowchart or described in other manners herein may be understood as being indicative of including one or more modules, segments or parts for realizing the codes of executable instructions of the steps in specific logic functions or processes, and that the scope of the preferred embodiments of the present application include other implementations, wherein the functions may be executed in manners different from those shown or discussed (e.g., according to the related functions in a substantially simultaneous manner or in a reverse order), which shall be understood by a person skilled in the art.

The logic and/or steps shown in the flowcharts or described in other manners here may be, for example, understood as a sequencing list of executable instructions for realizing logic functions, which may be implemented in any computer readable medium, for use by an instruction executing system, apparatus or device (such as a system based on a computer, a system including a processor, or other systems capable of extracting instructions from an instruction executing system, apparatus or device and executing the instructions), or for use in combination with the instruction executing system, apparatus or device.

The above descriptions and drawings show various features of the present application. It shall be understood that a person of ordinary skill in the art may prepare suitable computer codes to carry out each of the steps and processes described above and illustrated in the drawings. It shall also be understood that the above-described terminals, computers, servers, and networks, etc. may be any type, and the computer codes may be prepared according to the disclosure contained herein to carry out the present application by using the apparatus.

Particular embodiments of the present application have been disclosed herein. A person skilled in the art will readily recognize that the present application is applicable in other environments. In practice, there exist many embodiments and implementations. The appended claims are by no means intended to limit the scope of the present application to the above particular embodiments. Furthermore, any reference to "an apparatus configured to" is an explanation of apparatus plus function for describing elements and claims, and it is not desired that any element using no reference to "an apparatus configured to" is understood as an element of apparatus plus function, even though the wording of "apparatus" is comprised in that claim.

Although a particular preferred embodiment or embodiments have been shown and the present application has been described, it is will be clear and understood that equivalent modifications and variants are conceivable to a person skilled in the art in reading and understanding the description and drawings. Especially for various functions executed by the above elements (parts, components, apparatus, and compositions, etc.), except otherwise specified, it is desirable that the terms (including the reference to "apparatus") describing these elements correspond to any element executing particular functions of these elements (i.e. functional equivalents), even though the element is different from that executing the function of an exemplary embodiment or embodiments illustrated in the present application with respect to structure. Furthermore, although the a particular feature of the present application is described with respect to only one or more of the illustrated embodiments, such a feature may be combined with one or more other features of other embodiments as desired and in consideration of advantageous aspects of any given or particular application.

The invention claimed is:

1. A wireless charging method, comprising:
   activating a wireless charging function by a first mobile terminal and a second mobile terminal
   determining that the first mobile terminal is a wireless charging sender, and the second mobile terminal is a wireless charging receiver;
   performing a wireless charging on the second mobile terminal by the first mobile terminal; and
   before the first mobile terminal and the second mobile terminal activate the wireless charging function, i) selecting, by the first mobile terminal, from a plurality of mobile terminals based on priorities, and determining the second mobile terminal as an object to be charged; and/or ii) selecting, by the second mobile terminal, from a plurality of mobile terminals based on priorities, and determining the first mobile terminal as a charging party.

2. The wireless charging method according to claim 1, wherein the first mobile terminal and the second mobile terminal activate the wireless charging function by establishing an association through a short range communication.

3. The wireless charging method according to claim 1, wherein the first mobile terminal and/or the second mobile terminal activate the wireless charging function by receiving an instruction inputted by a user.

4. The wireless charging method according to claim 1, wherein the first mobile terminal and the second mobile terminal activate the wireless charging function according to detection information of a sensor.

5. The wireless charging method according to claim 1, wherein before the first mobile terminal and the second mobile terminal activate the wireless charging function, the method further comprises:
   comparing power of the first mobile terminal and the second mobile terminal;
   activating the wireless charging function by the first mobile terminal and the second mobile terminal when a difference between the power of the first mobile terminal and the second mobile terminal is larger than a predetermined threshold.

6. The wireless charging method according to claim 1, further comprising:
   by the second mobile terminal, directly using energy from the first mobile terminal, or storing the energy from the first mobile terminal into a battery.

7. The wireless charging method according to claim 1, wherein before the first mobile terminal performs a wireless charging on the second mobile terminal, the method further comprises:
   determining, by the first mobile terminal, a charging mode for performing a wireless charging on the second mobile terminal; and
   performing the wireless charging on the second mobile terminal according to the charging mode.

8. The wireless charging method according to claim 2, wherein the first mobile terminal initiating the short range communication is determined as the wireless charging sender, and the second mobile terminal receiving the short range communication is determined as the wireless charging receiver;
   or, the first mobile terminal receiving the short range communication is determined as the wireless charging sender, and the second mobile terminal initiating the short range communication is determined as the wireless charging receiver.

9. The wireless charging method according to claim 3, wherein the first mobile terminal receiving a send instruction is determined as the wireless charging sender, and the second mobile terminal receiving a receive instruction is determined as the wireless charging receiver;
   or, the first mobile terminal receiving the send instruction is determined as the wireless charging sender, and the second mobile terminal not receiving any instruction is determined as the wireless charging receiver.

10. A mobile terminal, comprising:
    a battery configured to store electric energy;
    a master controller configured to control the mobile terminal;
    a wireless charging transmitting circuit configured to wirelessly charge the electric energy stored in the battery into another mobile terminal, according to a control instruction from the master controller; and
    an object selection unit configured to select from a plurality of mobile terminals based on priorities, and determine one or more mobile terminals as an object to be charged; and/or select from a plurality of mobile terminals based on the priorities, and determine one or more mobile terminals as a charging party.

11. The mobile terminal according to claim 10, further comprising:
    an amplification circuit configured to amplify the electric energy outputted by the battery, and output the amplified electric energy into the wireless charging transmitting circuit; and
    an electromagnetic induction coil configured to convert the electric energy outputted by the wireless charging transmitting circuit into electromagnetic induction energy.

12. The mobile terminal according to claim 10, further comprising:
    a short range communication unit configured to activate a wireless charging function by establishing an association with the other mobile terminal.

13. The mobile terminal according to claim 10, further comprising:
an instruction receiving unit configured to activate a wireless charging function by receiving an instruction inputted by a user.

14. The mobile terminal according to claim 10, further comprising:
a wireless charging receiving circuit configured to receive energy wirelessly sent by another terminal; and
a charging controller configured to perform a control to directly use the energy from the wireless charging receiving circuit, or perform a control to store the energy from the wireless charging receiving circuit into a battery.

15. The mobile terminal according to claim 10, further comprising:
a power comparison unit configured to compare power of the mobile terminal and the other mobile terminal; and
when a difference between the power of the mobile terminal and the other mobile terminal is larger than a predetermined threshold, the master controller sends a control instruction for activating a wireless charging function.

16. The mobile terminal according to claim 10, further comprising:
a mode determination unit configured to determine a charging mode for performing a wireless charging on the other mobile terminal; and
the master controller controls the wireless charging transmitting circuit to perform a wireless charging on the other mobile terminal according to the charging mode.

17. The mobile terminal according to claim 10, further comprising:
a sensor configured to detect information related to the mobile terminal to activate a wireless charging function.

* * * * *